US012420293B2

(12) United States Patent
Chen

(10) Patent No.: US 12,420,293 B2
(45) Date of Patent: Sep. 23, 2025

(54) GARDENING SPRAYER

(71) Applicant: SHIN TAI SPURT WATER OF THE GARDEN TOOLS CO., LTD, Lukang Township, Changhua County (TW)

(72) Inventor: Chin-Yuan Chen, Lukang Township, Changhua County (TW)

(73) Assignee: SHIN TAI SPURT WATER OF THE GARDEN TOOLS CO., LTD, Changhua County (TW)

( * ) Notice: Subject to any disclaimer, the term of this patent is extended or adjusted under 35 U.S.C. 154(b) by 405 days.

(21) Appl. No.: 17/976,833

(22) Filed: Oct. 30, 2022

(65) Prior Publication Data

US 2024/0139760 A1 May 2, 2024

(51) Int. Cl.
*B05B 1/30* (2006.01)
*B05B 9/01* (2006.01)
*B05B 12/00* (2018.01)

(52) U.S. Cl.
CPC .............. *B05B 1/3026* (2013.01); *B05B 9/01* (2013.01); *B05B 12/0022* (2018.08)

(58) Field of Classification Search
CPC ....... B05B 1/3026; B05B 9/01; B05B 12/002; B05B 12/0022
USPC ................................ 239/525, 526, 583, 586
See application file for complete search history.

(56) References Cited

U.S. PATENT DOCUMENTS 3,722,800 A * 3/1973 Shames ................. B05B 1/3013 137/625.48
6,220,530 B1 * 4/2001 Wu ......................... B05B 1/304 239/525
6,659,373 B1 * 12/2003 Heren ...................... B67D 7/36 239/570
10,443,757 B1 * 10/2019 Wang ...................... F16K 31/44
11,319,219 B2 * 5/2022 Zhang ................ B01D 39/1623
2015/0060569 A1 * 3/2015 Yu ......................... B05B 12/002 239/393
2017/0182504 A1 * 6/2017 Ho .......................... B05B 1/185
2018/0361414 A1 * 12/2018 Chen ..................... B05B 1/3073
2020/0238319 A1 * 7/2020 Zhang ................... B05B 12/002

* cited by examiner

*Primary Examiner* — Darren W Gorman

(57) ABSTRACT

A gardening sprayer has a main body, an adjusting valve and an output unit. Both ends of the main body are respectively provided with an input portion and an output portion, a flow channel is provided between the input portion and the output portion, and a flow channel is connected between the input portion and the output portion through the periphery of the main body and is connected with the flow channel with a flow control aperture, so that the flow control aperture provides the adjusting valve for installation. The adjusting valve has a shaft bolt and a positioning sleeve which are put into the flow control aperture from two directions and then docked. Both of the shaft bolt and the positioning sleeve are provided with at least a sealing washer, and a blocking portion and the passing portion with a smaller diameter are formed on the shaft bolt.

8 Claims, 6 Drawing Sheets

GARDENING SPRAYER

BACKGROUND OF INVENTION

Field of Invention

The present invention relates to a gardening sprinkler, and more particularly to a gardening sprinkler with an adjusting valve.

Description of the Related Art

In order to avoid plants drying up and dying due to lack of water, watering routine is a very frequent and important gardening work. Usually the plants are planted in a wide range or a certain distance from the water source, therefore, the water hose extension is employed and connected to the water via a connector, then the water hose is connected to the sprinkler device.

Typical sprinklers usually directly uses the grip pressure to control the opening and closing of the water flow or adjusting the amount of the water outlet, and the fingers must tightly hold the button or the handle during use, which is quite inconvenient to use.

Therefore, it is desirable to provide a gardening sprinkler to mitigate and/or obviate the aforementioned problems.

SUMMARY OF THE INVENTION

An objective of present invention is to provide a gardening sprinkler which is capable of improving the above-mention problems.

In order to achieve the above mentioned objective, a gardening sprinkler has a main body, an adjusting valve and an output unit.

The main body has an input portion and an output portion at respective ends, the output portion comprising the output unit, and a flow channel disposed between the input portion and the output portion; when the input portion of the main body is connected to a water source, water flows through the flow channel, the output portion and the output unit, and a flow control aperture passing through the main body and connecting to the flow channel is disposed between the input portion and the output portion, for accepting the adjusting valve. The adjusting valve has a shaft bolt and a positioning sleeve respectively combined from two opposite sides of the flow control aperture, a stopping edge disposed respectively on the shaft bolt and the positioning sleeve limiting movement of the shaft bolt such that the adjusting valve is only capable of moving in the flow control aperture without escaping; furthermore, both of the shaft bolt and the positioning sleeve are respectively jacketed with at least one sealing washer, and the shaft bolt has a blocking portion and a passing portion with a smaller diameter.

Other objects, advantages, and novel features of invention will become more apparent from the following detailed description when taken in conjunction with the accompanying drawings.

DETAILED DESCRIPTION OF THE PREFERRED EMBODIMENT

Figure 1:
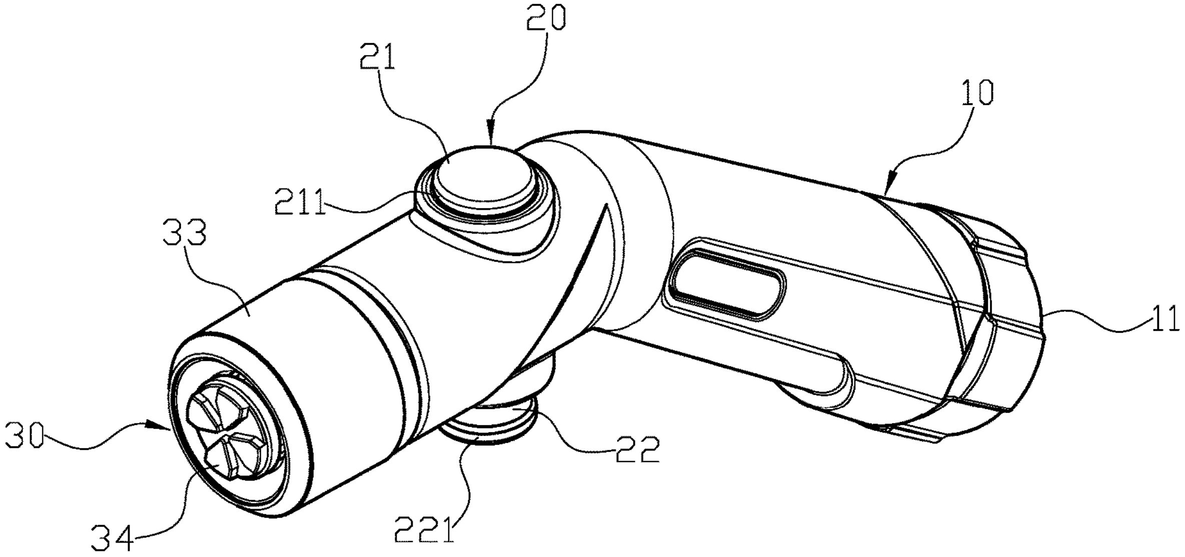
FIG. 1 is a three-dimensional combined view of a preferred embodiment according to the present invention.
Figure 2:
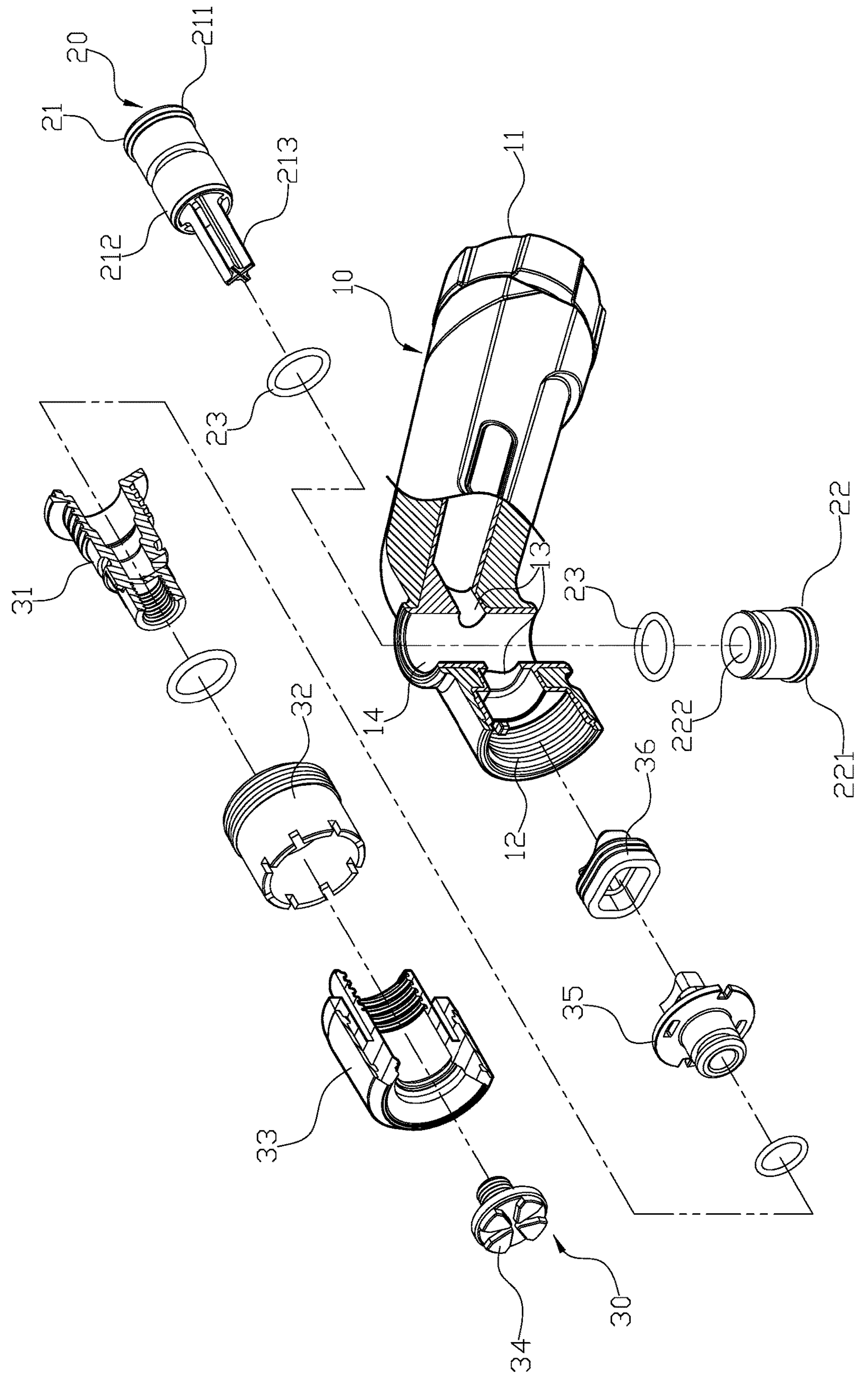
FIG. 2 is a three-dimensional exploded view of the preferred embodiment according to the present invention.
Figure 3:
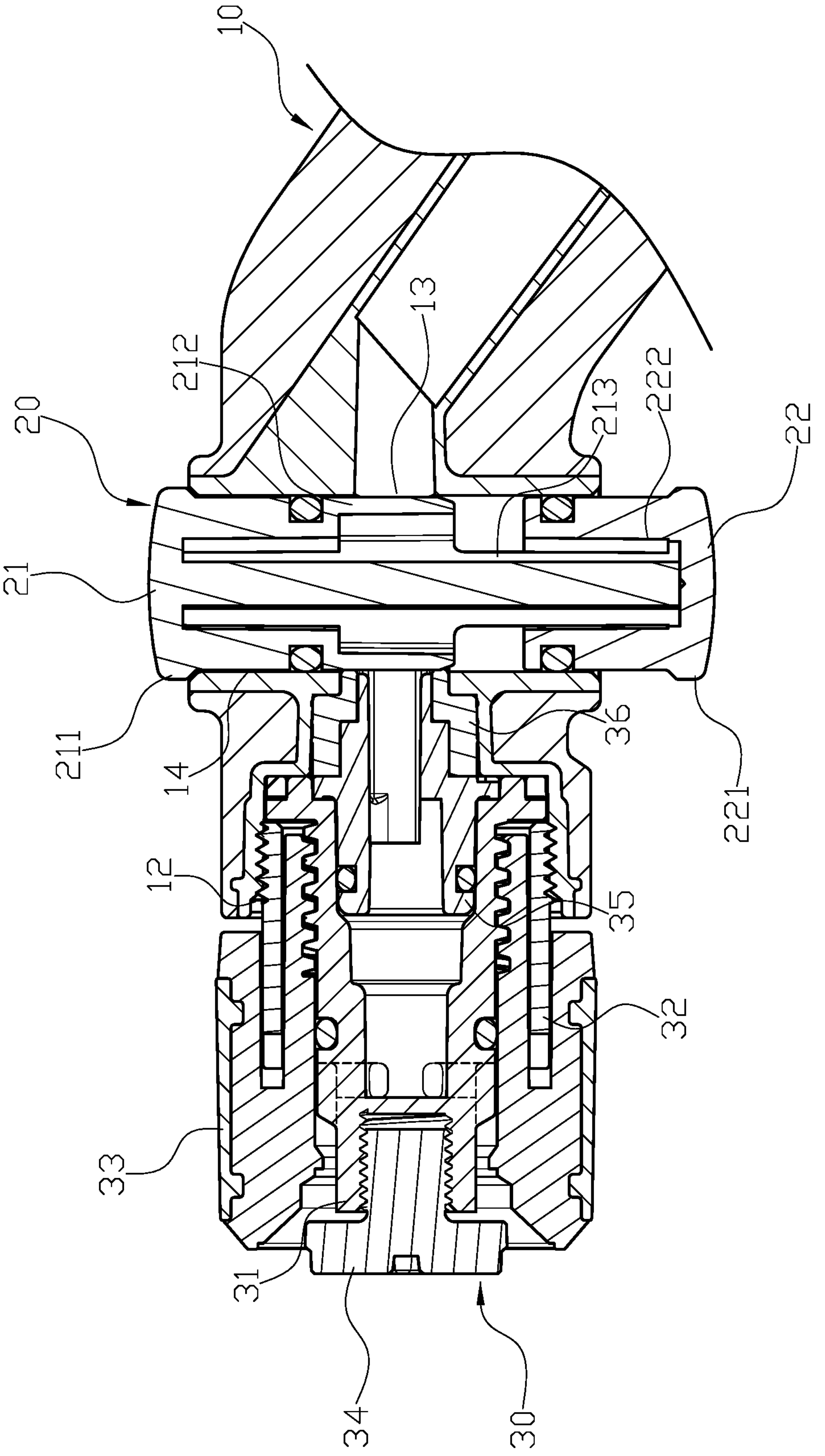
FIG. 3 is a cross-sectional view of the preferred embodiment according to the present invention.
Figure 4:
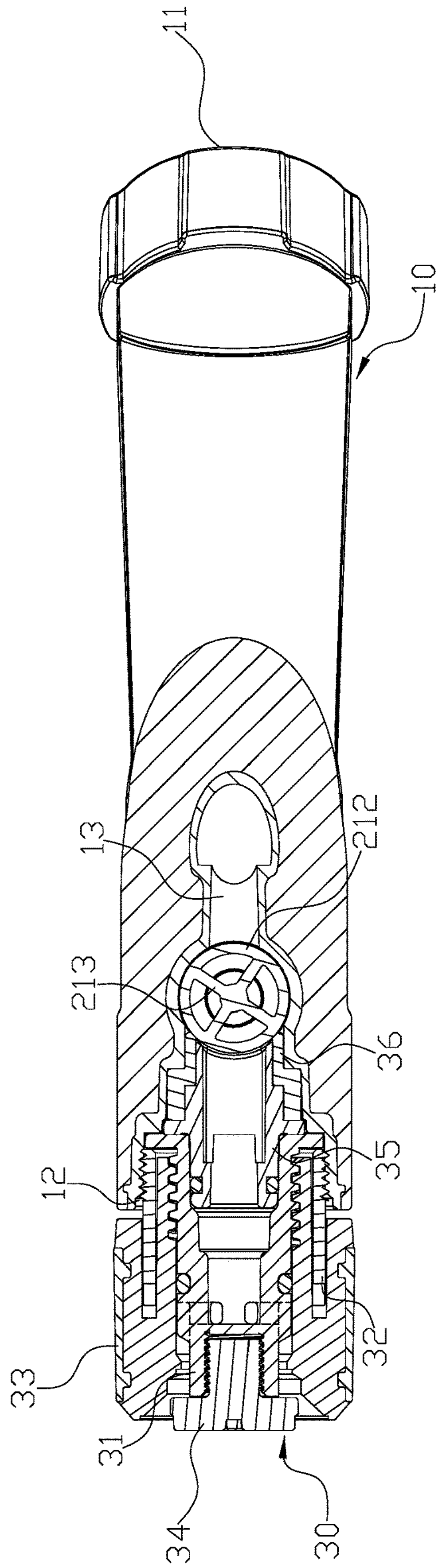
FIG. 4 is a cross-sectional view from another angle of the preferred embodiment according to the present invention.

First, please refer to FIG. 1-FIG. 4. A gardening sprayer comprises a main body 10, an adjusting valve 20 and an output unit 30. The main body 10 has an input portion 11 and an output portion 12 at respective ends. The output portion 12 is installed with the output unit 30, and a flow channel is disposed between the input portion 11 and the output portion 12. When the input portion 11 of the main body 10 is connected to a water source, water flows through the flow channel 13, the output portion 12 and the output unit 30. A flow control aperture 14 passes through the main body and connects to the flow channel 13, and the flow control is disposed between the input portion 11 and the output portion 12 and used for accepting the adjusting valve 20. The adjusting valve 20 has a shaft bolt 21 and a positioning sleeve 22 sleeve respectively combined from two opposite sides of the flow control aperture 14. a stopping edge 211, 221 disposed respectively on the shaft bolt 21 and the positioning sleeve 22 limits movement of the shaft bolt such that the adjusting valve 20 is only capable of moving in the flow control aperture 14 without escaping. Furthermore, both of the shaft bolt 21 and the positioning sleeve 22 re jacketed with at least one sealing washer 23, and the shaft bolt 21 has a blocking portion 212 and a passing portion 213 with a smaller diameter. When the adjusting valve 20 is pushed, the blocking portion 212 is capable of providing varying degrees of blocking to the flow channel 13, to allow the adjusting valve 20 to control or adjust the flow flux of the main body 10.

Moreover, the flow control aperture 14 passes through an upper and a lower edge of the main body 10.

Alternatively, the flow control aperture 14 passes through a left and a right edge of the main body 10.

Furthermore, the shaft bolt 21 and the positioning sleeve 22 are combined by a high-frequency induction hardening process.

In addition, the passing portion 213 of the shaft bolt 21 is a cross bar and combined with the positioning sleeve 22.

Also, one end of the positioning sleeve 22 has a socket 222 for accepting the passing portion 213.

Furthermore, the output unit further 30 comprises an outlet pipe 31 mounted on the output portion 12, a fixing ring 32, an outlet end 33 and a knob 34, and an outlet pipe seat 35 and a sealing sleeve 36 are disposed between the outlet pipe 31 and the main body 10.

Moreover, the main body 10, the outlet pipe 31, the fixing ring 32, and an outlet end 33 are all screwed together, and the knob 34 is screwed onto a front end of the outlet pipe 31.

Figure 5:
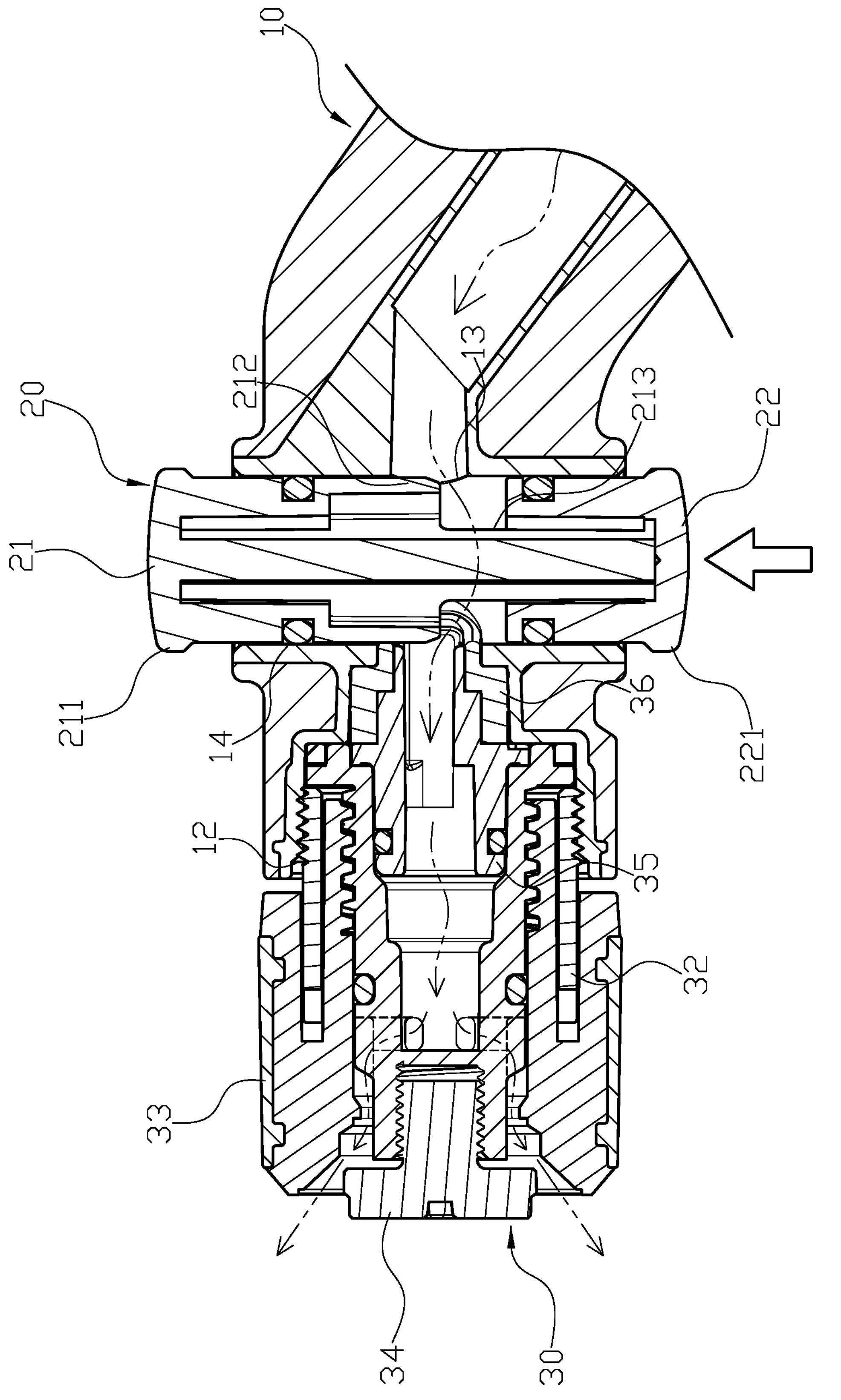
FIG. 5 is a schematic drawing of the water outlet after the adjusting valve is moved according to the preferred embodiment of the present invention.
Figure 6:
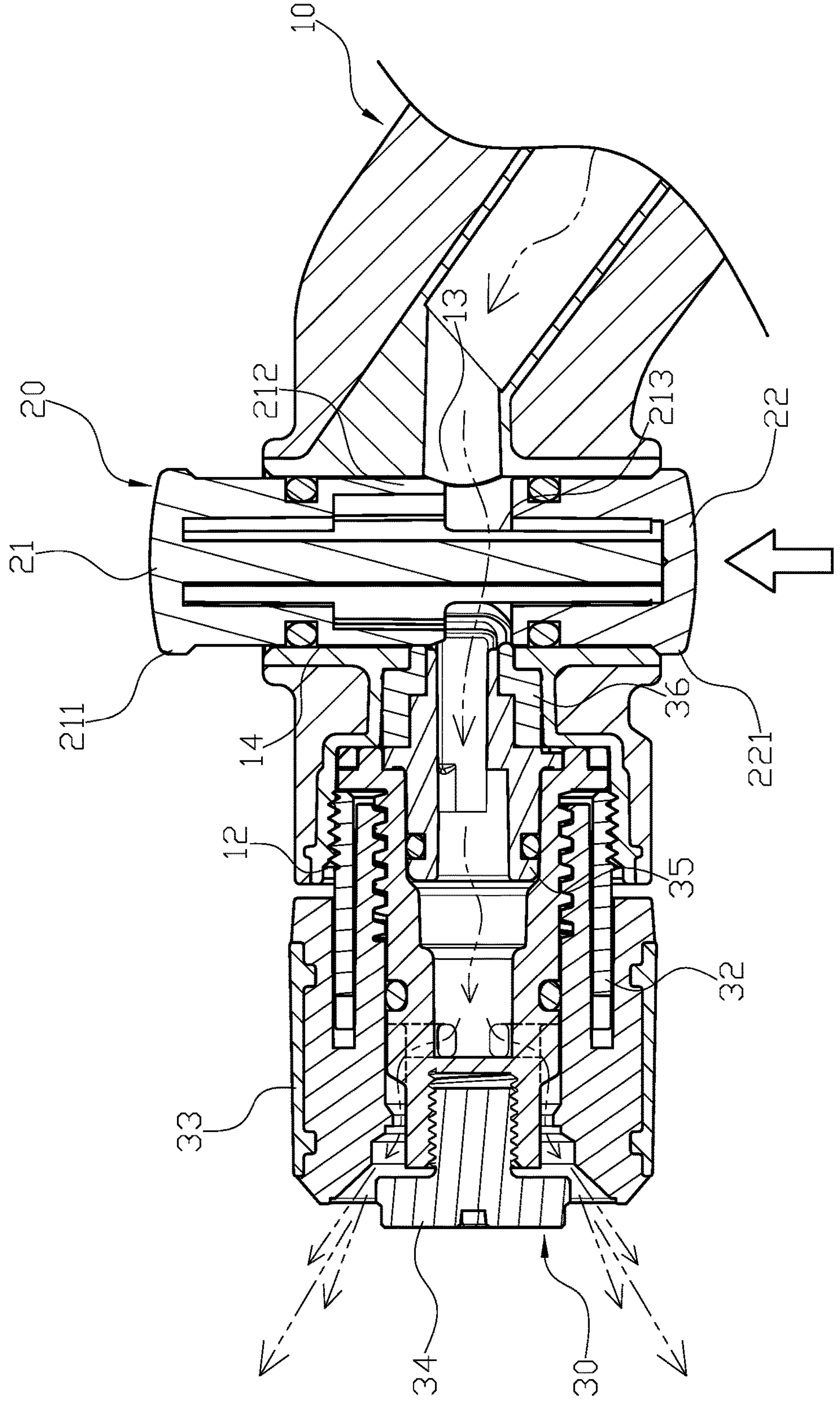
FIG. 6 is an operating schematic drawing of increased water flow according to the preferred embodiment of the present invention.

During actual operation, the adjusting valve 20 is pressed and pushed in one direction with a finger, so that the blocking portion 212 can gradually uncover the flow channel 13 during the moving process of the adjusting valve, to send the water entering the main body 10 to flow into the output portion 12 through the passing portion 213 to be further ejected from the output unit 30 (As shown in FIG. 5). Moreover, the change of the pressing pressure can also be used to control the flow rate of the water, as shown in FIG. 6, after adjustment, the user can remove his/her fingers from the adjusting valve 20 to avoid the need to keep pressing, which may easily cause hand fatigue and soreness. In order to turn off the water, you can push the adjusting valve 20 back in the opposite direction.

By the structure of the above-mentioned specific embodiment, the following benefits can be obtained: 1. With the adjusting valve 20, it is not necessary to press the gardening sprinkler all the time, and the water can still be smoothly discharged, which is more labor-saving in use, effectively reduces the burden on the hands and keeps the water supply at a certain flux amount. 2. The adjusting valve 20 utilizes the connection between the shaft bolt 21 and the positioning sleeve 22 to achieve the advantages of simple structure and faster assembly.

Although the present invention has been explained in relation to its preferred embodiment, it is to be understood that many other possible modifications and variations can be made without departing from the spirit and scope of invention as hereinafter claimed.

What is claimed is:

1. A gardening sprayer comprising: a main body, an adjusting valve and an output unit; wherein:

the main body has an input portion and an output portion at respective ends, the output portion comprising the output unit, and a flow channel disposed between the input portion and the output portion; when the input portion of the main body is connected to a water source, water flows through the flow channel, the output portion and the output unit, and a flow control aperture passing through the main body and connecting to the flow channel is disposed between the input portion and the output portion, for accepting the adjusting valve;

the adjusting valve has a shaft bolt and a positioning sleeve respectively combined from two opposite sides of the flow control aperture, a stopping edge disposed respectively on the shaft bolt and the positioning sleeve limiting movement of the shaft bolt such that the adjusting valve is only capable of moving in the flow control aperture without escaping;

furthermore, both of the shaft bolt and the positioning sleeve are respectively jacketed with at least one sealing washer, and the shaft bolt has a blocking portion having an outer diameter and a passing portion with a smaller outer diameter than the outer diameter of the blocking portion.

2. The gardening sprayer as claimed in claim 1, wherein the flow control aperture passes through an upper and a lower edge of the main body.

3. The gardening sprayer as claimed in claim 1, wherein the flow control aperture passes through a left and a right edge of the main body.

4. The gardening sprayer as claimed in claim 1, wherein the shaft bolt and the positioning sleeve are combined by a high-frequency induction hardening process.

5. The gardening sprayer as claimed in claim 1, wherein the passing portion of the shaft bolt is a cross bar and combined with the positioning sleeve.

6. The gardening sprayer as claimed in claim 5, wherein one end of the positioning sleeve has a socket for accepting the passing portion.

7. The gardening sprayer as claimed in claim 1, wherein the output unit further comprises an outlet pipe mounted on the output portion, a fixing ring, an outlet end and a knob, and an outlet pipe seat and a sealing sleeve are disposed between the outlet pipe and the main body.

8. The gardening sprayer as claimed in claim 7, wherein the main body, the outlet pipe, the fixing ring, and the outlet end are all screwed together, and the knob is screwed onto a front end of the outlet pipe.

* * * * *